(12) United States Patent
Matsuda (10) Patent No.: US 8,789,640 B2
(45) Date of Patent: Jul. 29, 2014

(54) ELECTRIC MOTORCYCLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/885,670

(22) PCT Filed: Nov. 18, 2010

(86) PCT No.: PCT/JP2010/006763
§ 371 (c)(1),
(2), (4) Date: May 15, 2013

(87) PCT Pub. No.: WO2012/066599
PCT Pub. Date: May 24, 2012

(65) Prior Publication Data
US 2013/0233634 A1     Sep. 12, 2013

(51) Int. Cl.
*B62K 11/02* (2006.01)
*B62K 11/06* (2006.01)

(52) U.S. Cl.
CPC ............. *B62K 11/02* (2013.01); *B62K 2208/00* (2013.01); *B62K 11/06* (2013.01); *B62K 2204/00* (2013.01)
USPC ..................... 180/220; 180/206.1; 180/68.5

(58) Field of Classification Search
USPC ............... 180/220, 68.5, 206.1; 280/278, 287
See application file for complete search history.

(56) References Cited

U.S. PATENT DOCUMENTS

| | | | | |
|---|---|---|---|---|
| 4,600,207 A | * | 7/1986 | Zosi | 280/279 |
| 4,770,434 A | * | 9/1988 | Pietro | 280/278 |
| 5,207,288 A | * | 5/1993 | Ono | 180/220 |
| 5,749,429 A | * | 5/1998 | Yamauchi et al. | 180/206.4 |
| 5,798,702 A | * | 8/1998 | Okamoto et al. | 340/636.1 |
| 6,095,270 A | * | 8/2000 | Ishikawa | 180/68.5 |
| 6,276,479 B1 | * | 8/2001 | Suzuki et al. | 180/206.8 |
| 7,210,548 B2 | * | 5/2007 | Yonehana et al. | 180/68.5 |
| 7,637,521 B2 | * | 12/2009 | Grant | 280/279 |
| 7,934,576 B2 | * | 5/2011 | Munksoe | 180/220 |

(Continued)

FOREIGN PATENT DOCUMENTS

| | | |
|---|---|---|
| JP | 363064 U | 6/1991 |
| JP | 05112352 A | 5/1993 |

(Continued)

OTHER PUBLICATIONS

ISA Japan, International Search Report of PCT/JP2010/006763, Feb. 9, 2011, WIPO, 4 pages.

*Primary Examiner* — Kevin Hurley
*Assistant Examiner* — Michael Stabley
(74) *Attorney, Agent, or Firm* — Alleman Hall McCoy Russell & Tuttle LLP (57) ABSTRACT

An electric motorcycle according to the present invention includes an electric motor generating traveling power to be transmitted to a driving wheel, a battery supplying electric power to the electric motor, a battery case accommodating the battery, and a body frame having a head pipe supporting a steering shaft, and a frame portion extending substantially rearward from the head pipe. The battery case has a first connecting portion to be coupled to a first member forming the body frame, and a second connecting portion arranged away from the first connecting portion in the up and down direction or the forward and rearward direction and coupled to a second member forming the body frame, so as to form a part of the frame portion.

15 Claims, 5 Drawing Sheets

(56) References Cited

U.S. PATENT DOCUMENTS

| | | | |
|---|---|---|---|
| 2003/0051934 A1* | 3/2003 | Ou | 180/220 |
| 2005/0217910 A1* | 10/2005 | Yonehana et al. | 180/68.5 |
| 2010/0237585 A1* | 9/2010 | Binggeli et al. | 280/288.4 |
| 2012/0111651 A1* | 5/2012 | Irie et al. | 180/65.1 |
| 2013/0032427 A1* | 2/2013 | Ishikawa et al. | 180/220 |
| 2013/0216885 A1* | 8/2013 | Kawatani et al. | 429/100 |
| 2013/0241170 A1* | 9/2013 | Talavasek et al. | 280/279 |
| 2013/0256049 A1* | 10/2013 | Matsuda | 180/220 |

FOREIGN PATENT DOCUMENTS

| | | |
|---|---|---|
| JP | 11059532 A | 3/1999 |
| JP | 2000238675 A | 9/2000 |
| JP | 2005239032 A | 9/2005 |
| JP | 2010083347 A | 4/2010 |

* cited by examiner

ELECTRIC MOTORCYCLE

TECHNICAL FIELD

The present invention relates to an electric motorcycle of which traveling power is generated by an electric motor.

BACKGROUND ART

In recent years, for a purpose of environmental protection and the like, an electric motorcycle in which an electric motor to be driven by electric energy stored in a battery is used as a traveling power source has been developed (for example, refer to Patent Document 1). The battery of Patent Document 1 is supported on a body frame.

PRIOR ART DOCUMENTS

Patent Documents

Patent Document 1: Japanese Unexamined Patent Publication No, 2010-83347.

SUMMARY OF THE INVENTION

Problems to be Solved by the Invention

An electric motor mounted in a conventional electric motorcycle is relatively small, and hence capable of generating only the same traveling power as that of a 50-cc engine. Therefore, a battery serving as a power source of the electric motor is only required to have such size and weight that the battery can be supported on a body frame. In a case where an electric motorcycle corresponding to a sport-type bike and a cruiser is provided, there is a need for mounting a large and heavy battery so that larger traveling power can be generated for a long time. When a conventional battery attachment structure is adopted as it is, the size of a vehicle body is highly increased.

An object of the present invention is to suppress a size increase of a vehicle body of an electric motorcycle upon mounting a large and heavy battery.

Means for Solving the Problems

Solutions to the Problems

The present invention is made in order to achieve the above object, and an electric motorcycle according to the present invention comprises: an electric motor generating traveling power to be transmitted to a driving wheel; a battery supplying electric power to the electric motor; a battery case accommodating the battery; and a body frame having: a head pipe supporting a steering shaft; and a frame portion extending substantially rearward from the head pipe, wherein the battery case has a first connecting portion coupled to a first member forming the body frame, and a second connecting portion arranged away from the first connecting portion in the up and down direction or the forward and rearward direction and coupled to a second member forming the body frame, so as to form a part of the frame portion.

With the above configuration, the battery case forms a part of the frame portion. Thus, in comparison to a case where the battery is supported on the existing body frame or accommodated in an accommodation space formed in the vehicle, a size increase of a vehicle body can be avoided. The battery case has the first connecting portion to be coupled to the first member and the second connecting portion to be coupled to the second member forming the body frame. Thus, the frame portion also serving as the battery case can be modularized, so that the motorcycle can be more easily manufactured.

A center of the battery case may be arranged on the front side of an intermediate position in the forward and rearward direction between a center of a front wheel and a center of a rear wheel.

With the above configuration, a weight balance can be leaned on the front side. Thus, a slippage of the front wheel can be favorably suppressed.

The battery case may be arranged so as to be overlapped with a line connecting the head pipe and a grounding point of the rear wheel in a side view.

With the above configuration, the battery case is arranged on a roll axis. Thus, steering operability is improved.

The first member may be provided in the head pipe, and the battery case may extend rearward and downward from a side of the first member.

With the above configuration, a structure that the weight balance is leaned on the front side and the battery case is arranged on the roll axis is realized.

The battery case may be formed in a substantially cubic shape and have rectangular front and rear wall portions which are parallel to each other, a longitudinal direction of the battery case may be in the forward and rearward direction, and the first connecting portion and the second connecting portion may be provided on an outer surface of the front wall portion and an outer surface of the rear wall portion, respectively.

With the above configuration, a cross section becomes rectangular. Thus, the second moment of area can be increased, so that rigidity against bending about an axis in the left and right direction and bending about an axis in the up and down direction can be ensured.

Four of the first connecting portions may be provided at four corners of the outer surface of the front wall portion, and four of the second connecting portions may be provided at four corners of the outer surface of the rear wall portion.

With the above configuration, rigidity against torsion about an axis in the forward and rearward direction can be ensured.

The battery case may have four side wall portions placed between the front wall portion and the rear wall portion, and the front wall portion and the rear wall portion may have larger thickness than the four side wall portions.

With the above configuration, the rigidity against the torsion about the axis in the forward and rearward direction can be ensured.

The battery case may have: four side wall portions placed between the front wall portion and the rear wall portion; and four beam portions respectively provided in angular portions where two adjacent side wall portions among the four side wall portions cross each other, the beam portions extending between the front wall portion and the rear wall portion.

With the above configuration, rigidity against compression and tension in the forward and rearward direction can be ensured.

The battery case may have a pair of pillar portions which are parallel to each other, the pillar portions connecting two adjacent front end portions among front end portions of the four beam portions, and the first connecting portion and the second connecting portion may be arranged so as to be overlapped with the beam portions and the pillar portions when seen in an extending direction of the battery case.

With the above configuration, attachment strength of the first connecting portion and the second connecting portion can be improved.

The battery case may have a traveling wind inlet for bringing traveling wind into the battery case, and a traveling wind outlet for bringing out the traveling wind brought into the battery case.

With the above configuration, the battery in the battery case can be cooled down by utilizing the traveling wind.

Effects of the Invention

In such a way, according to the present invention, the size increase of the vehicle body of the electric motorcycle can be suppressed.

BRIEF DESCRIPTION OF THE DRAWINGS

FIG. 4 (b) shows a perspective view showing connection members according to a modification of the second embodiment of the present invention.

EMBODIMENTS OF THE INVENTION

Hereinafter, embodiments of the present invention will be described with reference to the drawings. It should be noted that the directions in the following description are based on the directions seen from a driver on an electric motorcycle.

First Embodiment

Figure 1:
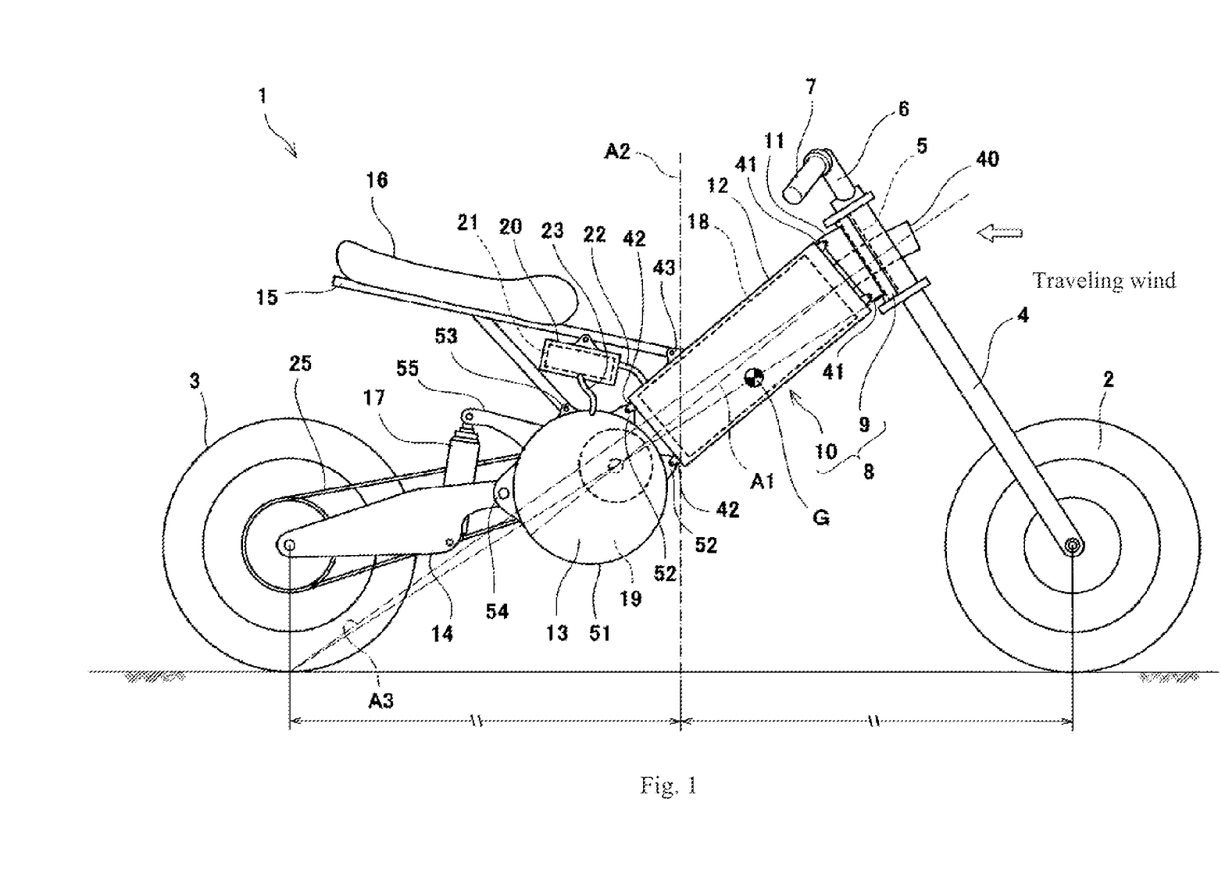
FIG. 1 shows a side view showing an electric motorcycle when seen from the right side according to a first embodiment of the present invention.

FIG. 1 is a side view showing an electric motorcycle 1 according to a first embodiment of the present invention when seen from the right side. The electric motorcycle 1 shown in FIG. 1 includes no combustion engine but travels by rotating a rear wheel 3 with power generated by an electric motor 19. The electric motorcycle 1 includes a front fork 4 provided in the substantially up and down direction at a predetermined caster angle, and a front wheel 2 serving as a driven wheel is rotatably supported on a lower portion of the front fork 4. A lower portion of a steering shaft 5 is connected to an upper portion of the front fork 4, and a bar-shaped handle 6 is attached to an upper portion of the steering shaft 5. An accelerator grip 7 is provided in a part of the handle 6 to be gripped by a right hand of a driver. The steering shaft 5 is turnably inserted into a head pipe 9 forming a body frame 8, and the front wheel 2 is steered by the driver turning the handle 6.

The head pipe 9 is coupled to a battery case 12 for accommodating a battery 18 via a connection frame 11. The battery case 12 is formed in a substantially cubic shape, and a center line A1 extending in the longitudinal direction of the battery case 12 extends rearward and downward along a center line in the vehicle width direction. A rear portion of the battery case 12 is coupled to a front portion of an electric motor case 13 for accommodating the electric motor 19. A front portion of a swing arm 14 extending in the substantially forward and rearward direction is pivoted on a rear portion of the electric motor case 13, and the rear wheel 3 is rotatably supported on a rear portion of the swing arm 14. A seat frame 15 for supporting a seat 16 on which the driver is seated is connected to an upper portion of the battery case 12 and an upper portion of the electric motor case 13. A rear wheel suspension 17 is bridged over the rear portion of the electric motor case 13 and the front portion of the swing arm 14.

In such a way, a frame portion 10 of the body frame 8 extending substantially rearward from the head pipe 9 to the rear wheel 3 is formed by the connection frame 11, the battery case 12, the electric motor case 13, the swing arm 14, and the seat frame 15. The battery case 12 and the electric motor case 13 also serve as a part of the body frame 8. The battery case 12 has not only a function of accommodating the battery 18 but also a function as a frame member which is conventionally called as a main frame in a general body frame, so that the electric motor case 13 and the head pipe 9 are coupled by one backbone frame. The electric motor case 13 has not only a function of accommodating the electric motor 19 but also a function as a frame member which is conventionally called as a pivot frame in a general body frame. Thereby, in comparison to a case where the battery case 12 is supported on the existing body frame, a case where the electric motor case 13 is supported on the existing body frame, and a case where the electric motor case 13 is adjacently arranged on the left side or the right side of the rear wheel 3, the number of parts of the body frame can be reduced and a size increase of the entire vehicle can also be suppressed. Since the battery case 12 and the electric motor case 13 are arranged along the center line in the vehicle width direction, a weight balance of the vehicle can be favorably suppressed from being leaned on the left or right side.

Since the battery case 12 is connected to the head pipe 9 for supporting the steering shaft 5 for front wheel steering via the connection frame 11, the battery case 12 is arranged on the relatively front side. Referring to a straight line A2 indicating an intermediate position in the forward and rearward direction between a center of the front wheel 2 and a center of the rear wheel 3, a part of the battery case 12 on the front side of the straight line A2 is larger than a part on the rear side of the straight line A2. In such a way, since the battery case 12 which is a heavy object is placed on the front side for offset, a gravity center G of the entire vehicle can be positioned on the front side of the straight line A2. Thereby, a wheelie and a slippage of the front wheel 2 can be suppressed.

FIG. 1 shows a straight line A3 connecting a center of the head pipe 9 and a grounding point of the rear wheel 3, the straight line extending rearward and downward in a side view. It should be noted that the straight line A3 is also called as a roll axis, and the center of the head pipe 9 is positioned on a center axis of the head pipe 9 and also positioned just in the middle in the axis direction. In the present embodiment, the battery case 12 extends rearward and downward from the head pipe 9. Thus, the battery case 12 can be arranged on the straight line A3 in a side view. The battery case 12 has high rigidity as described later. Since this highly-rigid part is arranged on the straight line A3, dynamic turning performance of the electric motorcycle 1 is improved. It should be noted that the steering shaft 5 extends in the direction vertical to a line connecting the grounding point of the rear wheel 3 and the gravity center G.

Further, in the present embodiment, the center line A1 of the battery case 12 is inclined downward more than the straight line A3. In other words, an angle made by the center line A1 and a horizontal line is larger than an angle made by the straight line A3 and the horizontal line. Therefore, referring to the straight line A3, a part of the battery case 12 on the upper side of the straight line A3 is smaller than a part on the lower side of the straight line A3. The electric motor case 13 is adjacent to the battery case 12 along the center line A1, and a relationship between the electric motor case 13 and the straight line A3 is the same as that of the battery case 12. In such a way, the battery case 12 and the electric motor case 13 which are heavy objects are placed on the lower side with respect to the straight line A3 for offset. Thus, the gravity center G of the entire vehicle can be positioned on the lower side of the straight line A3. Thereby, stability of straight traveling can be ensured.

The seat frame 15 supports an inverter case 20, and the inverter case 20 is arranged in the vicinity of the upper side of a rear end portion of the battery case 12 and in the vicinity of the upper side of a front end portion of the electric motor case 13. The inverter case 20 accommodates an inverter 21 for converting a direct current stored in the battery 18 into an alternating current to be supplied to the electric motor 19. The inverter 21 is connected to the battery 18 via a cable 22 and connected to the electric motor 19 via a cable 23. Since the inverter case 21 is in the vicinity of both the battery case 12 and the electric motor case 13, the entire configuration for supplying electric power from the battery 18 to the electric motor 19 via the inverter 21 can be formed to be compact.

Figures 2A, 2B, 2C:
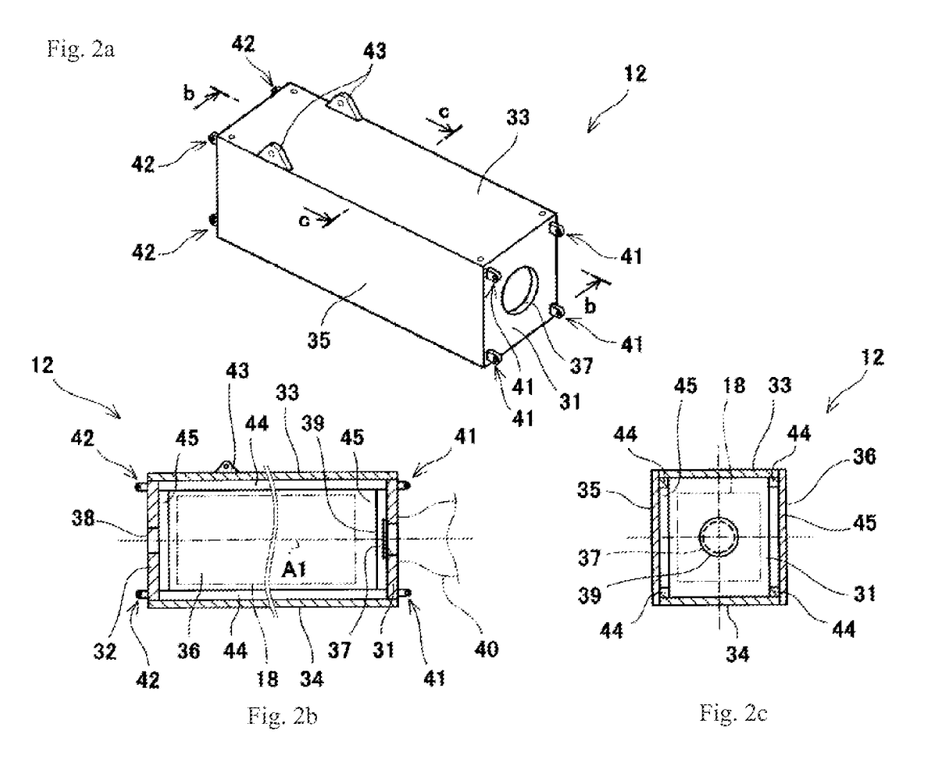
FIG. 2(a) shows a perspective view of a battery case shown in FIG. 1.
FIG. 2(b) shows a vertically sectional view of the battery case by line b-b of FIG. 2(a)
FIG. 2(c) shows a cross-sectional view of the battery case by line c-c of FIG. 2(a).

FIG. 2(a) is a perspective view of the battery case 12 shown in FIG. 1, FIG. 2(b) is a vertically sectional view of the battery case 12 by line b-b of FIG. 2(a), and FIG. 2(c) is a cross-sectional view of the battery case 12 by line c-c of FIG. 2(a). As shown in FIGS. 2(a) to 2(c), the battery case 12 has a front wall portion 31, a rear wall portion 32, an upper wall portion 33, a lower wall portion 34, a left side wall portion 35, and a right side wall portion 36, and is formed by combining these six wall portions 31 to 36 in a cubic shape. The front wall portion 31 and the rear wall portion 32 have an outer form of a substantially regular square, and are arranged in parallel to each other. The upper wall portion 33, the lower wall portion 34, the left side wall portion 35, and the right side wall portion 36 have an outer form of an oblong shape elongated in the forward and rearward direction, and connect the front wall portion 31 and the rear wall portion 32. Any of these wall portions is formed from highly-rigid metal such as aluminum, iron, magnesium, or titanium.

The battery 18 is accommodated in a space surrounded by inner surfaces of these six wall portions 31 to 36. A traveling wind inlet 37 for opening the space is formed at a central part of the front wall portion 31 and through the front wall portion 31, and a traveling wind outlet 38 for opening the space is formed through a central part of the rear wall portion 32. An air filter 39 is provided on the inner surface of the front wall portion 31 so as to cover the traveling wind inlet 37. A duct 40 is fixed to the front wall portion 31, and the duct 40 opens on the front side of the head pipe 9 (refer to FIG. 1). It should be noted that the duct 40 may be a single part independent from the parts forming the body frame 8, may include a part integrated with the head pipe 9, or may include a part integrated with the connection frame 11 (refer to FIG. 1). Traveling wind taken into the duct 40 is brought into the battery case 12 via the traveling wind inlet 37 and the air filter 39, passes through an interior of the battery case 12 in the longitudinal direction, and is brought out from the battery case 12 via the traveling wind outlet 38. Thereby, the battery 18 can be cooled down by the air, so that deterioration of the battery 18 can be favorably suppressed.

First connecting portions 41 for connecting the battery case 12 to the connection frame 11 (refer to FIG. 1) are provided on an outer surface of the front wall portion 31. The first connecting portions 41 are arranged at four corners of the outer surface. Each of the first connecting portions 41 includes two ribs protruding from the outer surface, and a through hole through which a bolt is inserted is formed in each of the ribs. Second connecting portions 42 for connecting the battery case 12 to the electric motor case 13 (refer to FIG. 1) are provided on an outer surface of the rear wall portion 32. The second connecting portions 42 are also arranged at four corners of the outer surface of the rear wall portion 32, and have the same structure as the first connecting portions 41. The first connecting portions 41 and the second connecting portions 42 are arranged so as to be overlapped with each other when seen in the longitudinal direction. In such a way, the cubic-shaped battery case 12 is supported on other frame members at four corners. Thus, rigidity against torsion about the center axis A1 is improved. It should be noted that connecting portions 43 for connecting the battery case 12 to the seat frame 15 (refer to FIG. 1) are provided on an outer surface of the upper wall portion 33.

Four wall portions of the upper wall portion 33, the lower wall portion 34, the left side wall portion 35, and the right side wall portion 36 cross adjacent two wall portions at right angle, and a cross section of the battery case 12 is a rectangular frame shape. Therefore, for example in comparison to a circular tube shape, the second moment of area about a neutral axis in the left and right direction and the second moment of area about a neutral axis in the up and down direction can be increased. Thereby, rigidity against up-down bending and left-right bending can be ensured. The cross section of the battery case 12 is a regular square frame shape in terms of an outer form and an inner form. Thus, the rigidity against the up-down bending and the left-right bending can be ensured in a well-balanced manner.

It should be noted that the shape of the cross section of the battery case 12 may be an oblong frame shape in which width of the upper wall portion 33 and the lower wall portion 34 is larger than height of the left side wall portion 35 and the right side wall portion 36. In this case, the rigidity against the left-right bending is preferentially improved, so that the dynamic turning performance of the electric motorcycle 1 is improved. In order to obtain the same effect, the sum of thickness of the left side wall portion 35 and the right side wall portion 36 may be larger than the sum of thickness of the upper wall portion 33 and the lower wall portion 34 while the outer form of the cross section is kept a regular square. The shape of the cross section may be changed so as to preferentially improve the rigidity against the up-down bending, and thereby, an effect of providing pliantness to the frame can be obtained.

Four wall portions of the upper wall portion 33, the lower wall portion 34, the left side wall portion 35, and the right side wall portion 36 cross adjacent two wall portions at right angle, so as to form four angular portions extending in the forward and rearward direction. Reinforcing beams 44 elongated in the forward and rearward direction are fixed on the inner surface side of each angular portion, and the reinforcing beams 44 connect the upper wall portion 33 and the lower wall portion 34. By providing such reinforcing beams 44, rigidity against compression and tension in the longitudinal direction is improved.

A pair of left and right reinforcing pillars 45 is fixed on the inner surface side of the front wall portion 31. Each of the reinforcing pillars 45 connects front end portions of two reinforcing beams 44 adjacent to each other in the up and down direction. A pair of left and right reinforcing pillars 45 is similarly fixed on the inner surface side of the rear wall portion 32. By providing such reinforcing pillars 45, the rigidity against the torsion about the center axis A1 is improved.

It should be noted that the connecting portions 41 to 43 are preferably formed on the reinforcing beams 44 and the reinforcing pillars 45. That is, the connecting portions 41, 42 may be arranged so as to be overlapped with the reinforcing pillars 45 when seen in the axis direction of the center axis A1 and in addition to this, to be overlapped with the reinforcing beams 44, and the connecting portions 43 may be arranged so as to be overlapped with the reinforcing beams 43 when seen in the surface normal direction of the upper wall portion 33 (direction orthogonal to the center axis A1). Thereby, attachment strength of these connecting portions 41 to 43 is enhanced.

Left side surfaces of the left reinforcing beams 44 are bonded to the inner surface of the left side wall 35, and right side surfaces of the right reinforcing beams 44 are bonded to the inner surface of the right side wall 36. By bonding the reinforcing beams 44 to the side walls 35, 36 in such a way, in comparison to a case where the reinforcing beams 44 are not bonded to the side walls 35, 36 but simply connect the front and rear walls 31, 32, torsion rigidity and vertical rigidity of a wall structure of the side walls 35, 36 can be enhanced. When the rigidity of the wall structure of the side walls 35, 36 is enhanced in such a way, the thickness of the upper wall portion 33 and the lower wall portion 34 can be smaller than that of the side walls 35, 36. At this time, the upper wall portion 33 and the lower wall portion 34 may be fixed to the side walls 35, 36 by screws. In such a way, the upper wall portion 33 and the lower wall portion 34 having relatively small thickness can provide a pliantness effect to the battery case 12.

Figure 3:
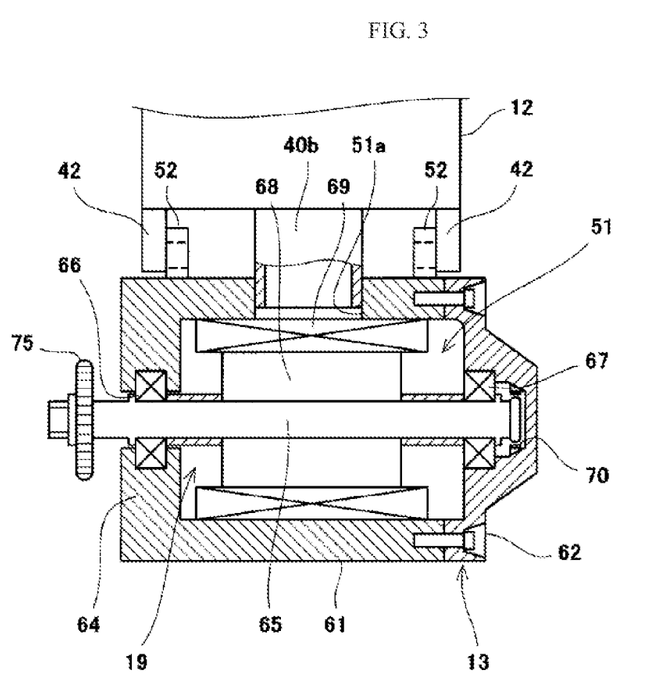
FIG. 3 shows a schematic sectional view of an electric motor case shown in FIG. 1.

FIG. 3 is a schematic sectional view of the electric motor case shown in FIG. 1. As shown in FIG. 3, the electric motor case 13 is formed by casting a metal material such as aluminum, and has a substantially cylindrical accommodation portion 51 for accommodating the electric motor 19. An axis of the accommodation portion 51 and an output shaft 65 of the electric motor 19 is directed in the left and right direction. The electric motor case 13 has a cylindrical case body 61 having an opening in a right end, and a cover 62 provided so as to close the opening of the case body 61, and the accommodation portion 51 is formed by closing the case body 61 with the cover 62. The output shaft 65 of the electric motor 19 is rotatably supported on a bearing 66 fitted into a left wall 64 of the case body 61 and a bearing 67 provided on an inner surface of the cover 62, and a rotor 68 and a stator coil 69 of the electric motor 19 are accommodated inside the case body 61. A left end portion of the output shaft 65 protrudes leftward from the left wall 64 of the case body 61. In this protruding end portion, a driving sprocket 75 of a chain transmission mechanism for transmitting rotation of the output shaft 65 to the rear wheel 3 (refer to FIG. 1) is provided. It should be noted that a resolver 70 for detecting a rotation angle of the output shaft is provided in a right end portion of the output shaft 65, and the resolver 70 is accommodated inside the cover 62.

Returning to FIG. 1, the electric motor case 13 has four third connecting portions 52 provided so as to protrude from a front portion of an outer peripheral surface of the accommodation portion 51 and arranged away from each other in the up and down and left and right directions. These third connecting portions 52 are respectively fastened to the four second connecting portions 42 described above by bolts. The electric motor case 13 has a connecting portion 53 provided so as to protrude from an upper portion of the outer peripheral surface of the accommodation portion 51, and the seat frame 15 is coupled to the connecting portion 53. The electric motor case 13 has a pair of arm support portions 54 provided so as to protrude from a rear portion of the outer peripheral surface of the accommodation portion 51 and arranged away from each other in the left and right direction, and a front end portion of the swing arm 14 is supported by this pair of arm support portions 54 pivotably about an axis in the left and right direction. The electric motor case 13 has a suspension support portion 55 extending rearward from a rear upper portion of the outer peripheral surface of the accommodation portion 51. The suspension support portion 55 protrudes from a central part in the axis direction of the accommodation portion 51, that is, a part between the pair of arm support portions 54, and an upper end portion of the rear wheel suspension 17 is supported by a front end portion of the suspension support portion 55 pivotably about the axis in the left and right direction.

In such a way, the electric motor case 13 has the cylindrical accommodation portion 51 whose axis is directed in the left and right direction. Thus, the protruding portions 52 to 55 for attachment can be provided at arbitrary positions in the circumferential direction of the outer peripheral surface. Even when the parts away from the axis of the accommodation portion 51 in the radial direction are arranged at any positions in the circumferential direction, the parts can be readily coupled to the electric motor case 13 by utilizing the protruding portions for attachment, so that the electric motor case 13 can be favorably utilized as a part of the body frame 8. Particularly, the electric motor case can be also easily coupled to the rear end portion of the battery case 12 in which inclination of a horizontal line is adjusted in relation to the straight line A3. By providing the third connecting portions 52 protruding from the outer peripheral surface, the front portion of the electric motor case 13 forming a curved surface and the rear end portion of the battery case 12 forming a flat surface can be easily coupled. Furthermore, since the electric motor case 13 is formed by casting, the accommodation portion and the protruding portions for attachment can be easily integrated.

Traveling power generated by the electric motor 19 which is accommodated in the electric motor case 13 is transmitted to the rear wheel 3 via a power transmission mechanism including a chain 25 and the like. Since the electric motor case 13 is arranged to the rear wheel 3 at a distance corresponding to length in the forward and rearward direction of the swing arm 14 at most, such a power transmission mechanism can be formed to be compact. Since the electric motor case 13 has the arm support portions 54 and the suspension support portion 55, the electric motor case 13 is formed in such a manner that a support structure of the swing arm 14 and a support structure of the rear wheel suspension 17 are integrated. Therefore, the swing arm 14 and the rear wheel suspension 17 and the electric motor case 13 can be unitized to be compact.

As shown in FIG. 3, a traveling wind intake port 51a may be formed in the accommodation portion 51, and the traveling wind outlet 38 of the battery case 12 (refer to FIG. 2) and the traveling wind intake port 51a, may be connected by a duct 40b. Thereby, the air can be sent inside the accommodation portion 51 in which the electric motor 19 is arranged via the battery case 12 and the duct 40b, so that the electric motor 19 can be favorably cooled down.

Second Embodiment

Figure 4A:
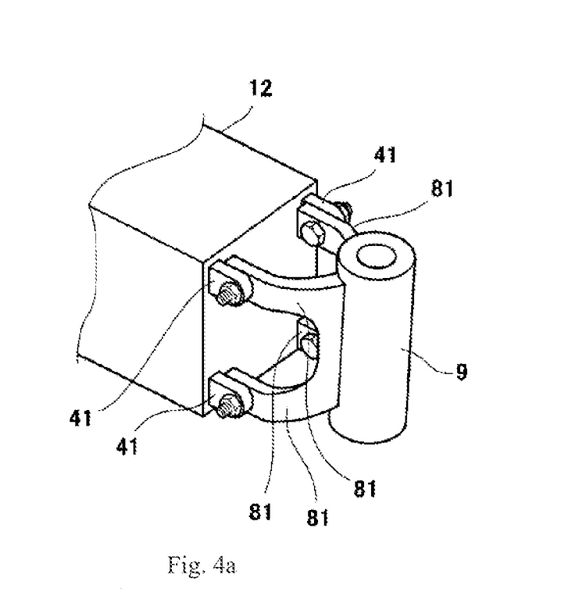
FIG. 4(a) shows a perspective view showing connection members according to a second embodiment of the present invention.
Figure 4B:
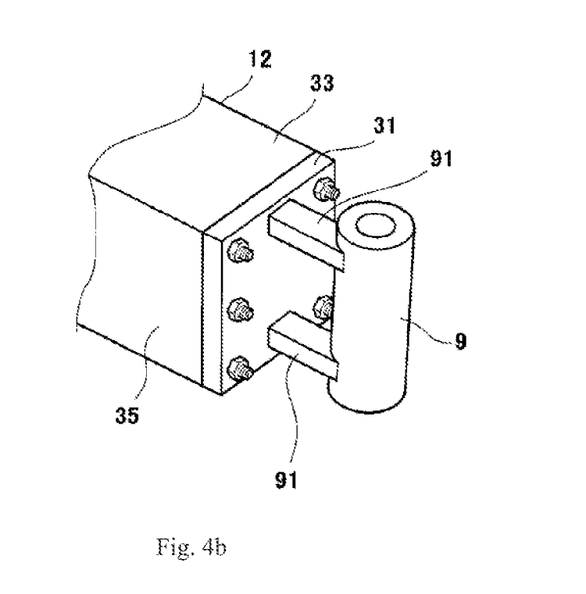

FIG. 4(a) is a perspective view showing connection members 81 according to a second embodiment of the present invention, and FIG. 4(b) a perspective view showing connection members 91 according to a modification of the second embodiment of the present invention. In the first embodiment, the flat plate-shaped connection member 11 (refer to FIG. 1) widened in the forward and rearward direction are branched into two from the head pipe 9. However, as shown in FIG. 4(a), the connection member may be branched into four from the head pipe 9 in accordance with the number and arrangement of the first connecting portions of the battery case. That is, a pair of upper and lower and a pair of left and right connection members 81 may be respectively connected to a total of four connecting portions 41. As shown in FIG. 4(b), the front wall portion 31 of the battery case 12, the head pipe 9, and connection members 91 for connecting the front wall portion and the head pipe 9 may be integrated by casting or the like, and this integrated part may be combined to the upper wall portion 33 and the side wall portion 35 of the battery case 12 by bolts.

Third Embodiment

Figure 5:
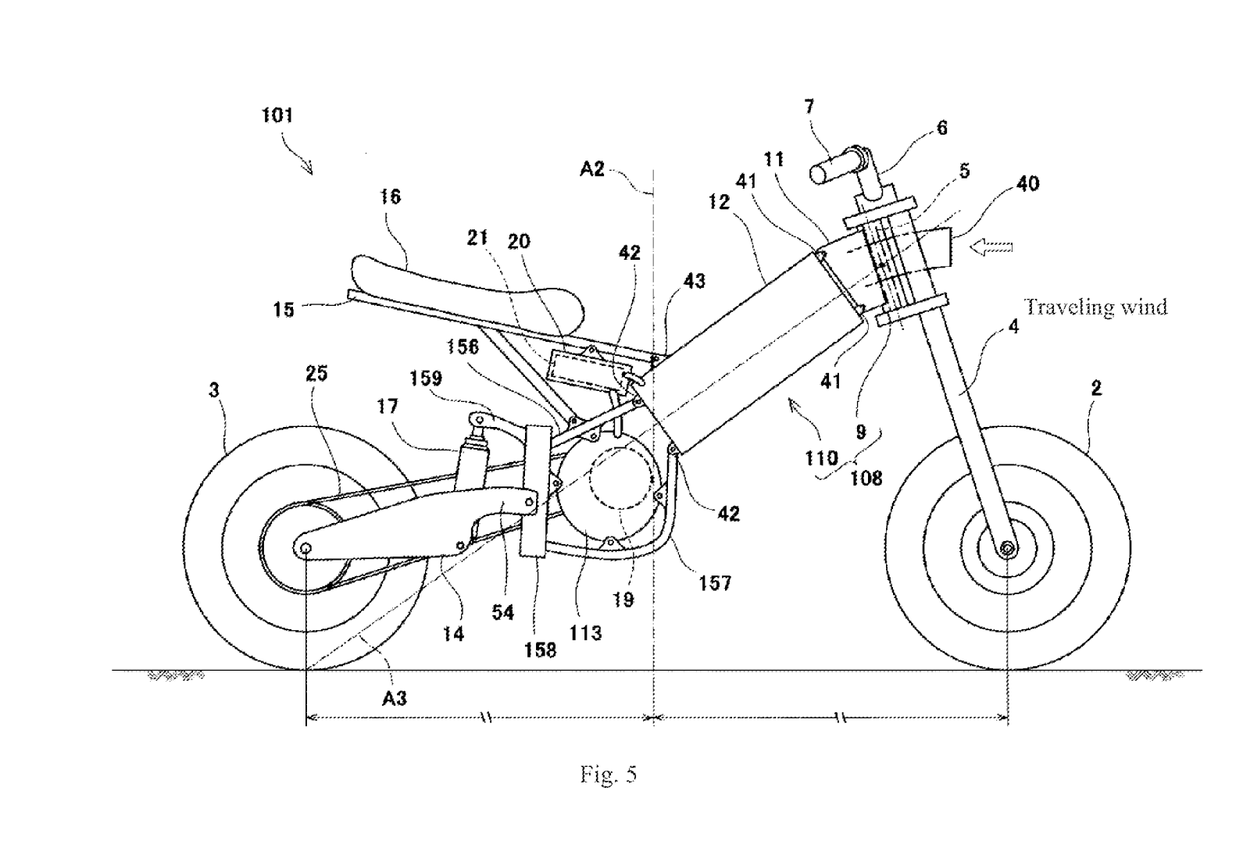
FIG. 5 shows a side view showing an electric motorcycle according to a third embodiment of the present invention when seen from the right side.

FIG. 5 is a side view showing an electric motorcycle 101 according to a third embodiment of the present invention when seen from the right side. The electric motorcycle 101 according to the present embodiment is different from the first embodiment in terms that an electric motor case 113 does not serve as a body frame 108. The same or corresponding elements as or to the first embodiment will be given the same reference signs, and overlapping detailed description will be omitted.

As shown in FIG. 5, the body frame 108 of the electric motorcycle 101 has the head pipe 9, and a frame portion 110 extending rearward from the head pipe 9, and the battery case 112 also serves as a part of the frame portion 110. A first rear frame 156 extending further rearward and downward from the battery case 112 is coupled to two upper second connecting portions among the second connecting portions 42 of the battery case 112. A second rear frame 157 extending downward from the battery case 112 and then bending and extending rearward is coupled to two lower second connecting portions among the second connecting portions 42 of the battery case 112. A pivot frame 158 is provided so as to couple a rear end portion of the first rear frame 156 and a rear end portion of the second rear frame 157 in the up and down direction. The front end portion of the swing arm 14 is pivoted on the pivot frame 158, and the upper end portion of the rear wheel suspension is pivotably coupled to an attachment tool 159 extending rearward from the pivot frame 158. The electric motor case 113 is accommodated in a space surrounded by the first rear frame 156, the second rear frame 157, and the pivot frame 158, and supported on these frames 156 to 158. In a frame structure of the present embodiment, as well as the above embodiments, even when the battery is large and heavy, the size increase of the vehicle body can be favorably suppressed.

It should be noted that the present invention is not limited to the embodiments described above but change, addition, or deletion can be made to the configuration thereof within a range not departing from the gist of the present invention. The above embodiments may be arbitrarily combined with each other. For example, a portion of configuration or method in one embodiment may be applied to other embodiments.

INDUSTRIAL APPLICABILITY

The present invention has an effect of suppressing the size increase of the vehicle body of the electric motorcycle upon mounting the large and heavy battery, and it is beneficial to apply the present invention to a large electric motorcycle corresponding to a sports utility vehicle and a cruiser.

DESCRIPTION OF REFERENCE SIGNS

1: Electric motorcycle
2: Front wheel
3: Rear wheel
5: Steering shaft
8: Body frame
9: Head pipe
10: Frame portion
11: Connection frame
12: Battery case
13: Electric motor case
14: Swing arm
15: Seat frame
18: Battery
19: Electric motor
20: Inverter case
21: Inverter
22, 23: Cable
37: Traveling wind inlet
38: Traveling wind outlet
41: First connecting portion
42: Second connecting portion
44: Reinforcing beam
45: Reinforcing pillar

The invention claimed is:

1. An electric motorcycle comprising:
an electric motor generating traveling power to be transmitted to a driving wheel;
a battery supplying electric power to the electric motor;
a battery case accommodating the battery; and
a body frame having: a head pipe supporting a steering shaft; and a frame portion extending substantially rearward from the head pipe, wherein
the battery case has a first connecting portion coupled to a first member forming the frame portion, and a second connecting portion arranged away from the first connecting portion in an up and down direction or a forward and rearward direction and coupled to a second member forming the frame portion,
the battery case forms a part of the frame portion and is removably coupled to the head pipe, and
the first member is integrated with the head pipe, the second member is a pivot frame supporting a swing arm or a rear frame coupled to the pivot frame, and the battery case is arranged on a straight line connecting the head pipe to the pivot frame in a side view.

2. The electric motorcycle according to claim 1, wherein a center of the battery case is arranged on a front side of an intermediate position in the forward and rearward direction between a center of a front wheel and a center of a rear wheel.

3. The electric motorcycle according to claim 1, wherein the battery case is arranged so as to be overlapped with a line connecting the head pipe and a grounding point of a rear wheel in a side view.

4. The electric motorcycle according to claim 1, wherein the first member is provided in the head pipe, and the battery case extends rearward and downward from a side of the first member.

5. The electric motorcycle according to claim 1, wherein the battery case is formed in a substantially cubic shape and has rectangular front and rear wall portions which are parallel to each other, a longitudinal direction of the battery case is in the forward and rearward direction, and the first connecting portion and the second connecting portion are provided on an outer surface of the front wall portion and an outer surface of the rear wall portion, respectively.

6. The electric motorcycle according to claim 5, wherein the battery case has four side wall portions placed between the front wall portion and the rear wall portion, and
the front wall portion and the rear wall portion have a larger thickness than the four side wall portions.

7. The electric motorcycle according to claim 1, wherein the battery case is removably coupled to the head pipe by a bolt.

8. The electric motorcycle according to claim 1, wherein the first connecting portion is provided on an outer surface of the battery case, and the first connecting portion is provided with a through hole through which a bolt is inserted.

9. The electric motorcycle according to claim 1, wherein the battery case has a front wall portion surrounding a space accommodating the battery, the front wall portion is integrated with the head pipe and the first member, and the front wall portion is connected to another wall portion of the battery case.

10. An electric motorcycle comprising:
an electric motor generating traveling power to be transmitted to a driving wheel;
a battery supplying electric power to the electric motor;
a battery case accommodating the battery; and
a body frame having: a head pipe supporting a steering shaft; and a frame portion extending substantially rearward from the head pipe, wherein
the battery case has a first connecting portion coupled to a first member forming the body frame, and a second connecting portion arranged away from the first connecting portion in an up and down direction or a forward and rearward direction and coupled to a second member forming the body frame, so as to form a part of the frame portion,
the battery case is formed in a substantially cubic shape and has rectangular front and rear wall portions which are parallel to each other, a longitudinal direction of the battery case is in the forward and rearward direction,
the first connecting portion and the second connecting portion are provided on an outer surface of the front wall portion and an outer surface of the rear wall portion, respectively, and
four of the first connecting portions are provided at four corners of the outer surface of the front wall portion, and four of the second connecting portions are provided at four corners of the outer surface of the rear wall portion.

11. An electric motorcycle comprising:
an electric motor generating traveling power to be transmitted to a driving wheel;
a battery supplying electric power to the electric motor;
a battery case accommodating the battery; and
a body frame having: a head pipe supporting a steering shaft; and a frame portion extending substantially rearward from the head pipe, wherein
the battery case has a first connecting portion coupled to a first member forming the body frame, and a second connecting portion arranged away from the first connecting portion in an up and down direction or a forward and rearward direction and coupled to a second member forming the body frame, so as to form a part of the frame portion,
the battery case is formed in a substantially cubic shape and has rectangular front and rear wall portions which are parallel to each other, a longitudinal direction of the battery case is in the forward and rearward direction,
the first connecting portion and the second connecting portion are provided on an outer surface of the front wall portion and an outer surface of the rear wall portion, respectively, and
the battery case has:
four side wall portions placed between the front wall portion and the rear wall portion; and
four beam portions respectively provided in angular portions where two adjacent side wall portions among the four side wall portions cross each other, the beam portions extending between the front wall portion and the rear wall portion.

12. The electric motorcycle according to claim 11, wherein the battery case has a pair of pillar portions which are parallel to each other, the pillar portions connecting two adjacent front end portions among front end portions of the four beam portions, and the first connecting portion and the second connecting portion are arranged so as to be overlapped with the beam portions and the pillar portions when seen in an extending direction of the battery case.

13. An electric motorcycle comprising:
an electric motor generating traveling power to be transmitted to a driving wheel;
a battery supplying electric power to the electric motor;
a battery case accommodating the battery; and
a body frame having: a head pipe supporting a steering shaft; and a frame portion extending substantially rearward from the head pipe, wherein
the battery case has a first connecting portion coupled to a first member forming the body frame, and a second connecting portion arranged away from the first connecting portion in an up and down direction or a forward and rearward direction and coupled to a second member forming the body frame, so as to form a part of the frame portion, and
the battery case has a traveling wind inlet for bringing traveling wind into the battery case, and a traveling wind outlet for bringing out the traveling wind brought into the battery case.

14. An electric motorcycle comprising:
an electric motor generating traveling power to be transmitted to a driving wheel;
a battery supplying electric power to the electric motor;
a battery case accommodating the battery; and
a body frame having: a head pipe supporting a steering shaft; and a frame portion extending substantially rearward from the head pipe, wherein
the battery case has a first connecting portion coupled to a first member forming the frame portion, and a second connecting portion arranged away from the first connecting portion in an up and down direction or a forward and rearward direction and coupled to a second member forming the frame portion,
the battery case forms a part of the frame portion and is removably coupled to the head pipe, and
an electric motor case accommodating the electric motor serves as a pivot frame supporting a swing arm, and the second member is the electric motor case.

15. The electric motorcycle according to claim 14, wherein the electric motor case is placed below the battery case.

* * * * *